March 10, 1970  L. FANICA ET AL  3,499,743
METHOD AND APPARATUS FOR THE MANUFACTURE OF GLASS UTILIZING
FLOATING MOLTEN ALKALI METAL SULFATE
Filed May 5, 1967  4 Sheets-Sheet 1

INVENTOR
Louis Fanica &
André Pons

BY *Bauer & Seymour*

ATTORNEY

INVENTOR
Louis Fanica &
André Pons

BY Bauer & Seymour
ATTORNEY

INVENTOR
Louis Fanica &
Andre Pons

BY *Bauer & Seymour*

ATTORNEY

United States Patent Office 3,499,743
Patented Mar. 10, 1970

---

3,499,743
METHOD AND APPARATUS FOR THE MANU-
FACTURE OF GLASS UTILIZING FLOATING
MOLTEN ALKALI METAL SULFATE
Louis Fanica, Sceaux, and Andre H. Pons, Bourg-la-
Reine, France, assignors to Compagnie de Saint-Gobain
Filed May 5, 1967, Ser. No. 636,410
Claims priority, application France, May 17, 1966,
61,915
Int. Cl. C03b 5/00
U.S. Cl. 65—27                                    5 Claims

---

ABSTRACT OF THE DISCLOSURE

A supernatant layer of a molten alkali metal sulfate floats in direct contact with the surface of a bath of molten glass in a furnace and is essentially insoluble in the molten glass. A mixture of raw batch glass making materials is deposited on the surface of the layer, and newly formed molten glass is withdrawn from beneath the layer from the bottom of the furnace.

---

This invention relates to a process and apparatus for the production of glass.

In conventional procedures of glass making, a mixture of granular or pulverulent materials such as silica, alumina, lime, soda, potash, etc., are deposited onto the surface of a molten mix or bath of the same materials confined in a tank furnace and maintained therein at a temperature of the order of 1400° to 1500° C. This mixture of vitrifiable materials is gradually heated and transformed into molten glass, essentially by the high temperature to which it is subjected within the furnace as it comes into contact with the bath of molten glass therein. The transmission of heat to the newly-introduced batches of granular or pulverulent materials is nevertheless relatively slow, and the viscosity of the vitrifiable product formed by the mix, is high.

For these reasons the speed of vitrification of the newly-added materials is slow and inherently limits the capacity of any given prior art furnace or installation.

In prior art procedures, because of the poor heat conduction of the vitrifiable material being introduced, it is not practically possible to increase the rate of production of any given furnace by increasing the temperature of the space above the molten bath, over that of the bath itself. For this reason it is the area of the surface of the molten bath within the furnace, or what is the same thing, the effective size of the furnace in horizontal section, that determines the practicable production rate of any given installation.

It suffices to recollect that according to the works of Delarue in the Belgian review "Silicates Industriels" of February 1962, pages 69 to 78, certain metallic oxides, notably the alkaline and alkaline-earth oxides, are soluble in substantial quantities in a medium of molten mineral salts such as the alkali halides or their eutectic mixtures, whereas the oxides of elements situated toward the middle of the periodic classification of elements, such as $SiO_2$, $Al_2O_3$, and $ZrO_2$, have very little solubility in such media. Furthermore it has been shown that the soluble oxides which have habitually been considered modifiers of the vitreous matrix, are extensively dissociated in this medium of molten salts, and that the ion $O^{--}$ as thus liberated is particularly reactive.

The present invention enables a material increase in the rate of production, size for size, over prior art glass-making furnaces, and is based upon the discovery that the usual constituents of glass compositions which supply the oxide modifiers, such as $Na_2CO_3$, $CaCO_3$, etc., are themselves strongly dissociated in electrolytic molten salts, and that the ion $O^{--}$ liberated, attacks the union Si—O—Si of the silica more effectively than the effect produced solely by the thermal action in the conventional fusion of materials to form glass.

The process of the present invention consists generally in adding the pulverulent or granular materials which are to form the glass, to an intermediate liquid consisting of a molten salt elevated to the temperature of reaction of the vitrifiable materials. This intermediate liquid, at the temperature indicated, is a solvent for at least one of the vitrifiable materials, but is not miscible or at least has a very low degree of miscibility with the nascent glass. The intermediate liquid also has a relatively low viscosity and a lower density than that of the vitrified glass.

Due to the fact that at least one of the vitrifiable materials which go into the glass, is soluble in the aforesaid intermediate liquid, it is diffused rapidly therein when the batch materials are first introduced into the furnace. In the present instance the silica dissociates under the action of the $O^{--}$ anions and provides the oxydizing agent which causes the precipitation to the bottom of the furnace, of a silicate, due to its insolubility in the intermediate liquid. The rate of reaction is augmented by the fact that the intermediate molten salt readily wets the particles of the silica and the other ingredients in the vitrifiable mix, so that the temperature of these ingridents is rapidly elevated as soon as they are deposited onto the molten bath. As the action proceeds, the glass which is formed, being immiscible in the intermediate liquid, separates out, due to the difference in density, while the gas which results from the reaction rises and the resulting ebullition of the molten mass aids the reaction and reduces the viscosity of the molten intermediate liquid, without affecting the much greater viscosity of the glass being formed. The glass produced is then freed from contaminants by known homogenization procedures as in the prior art production thereof.

The intermediate liquid mentioned may be in particular, a molten salt of an alkali metal, more particularly, sodium. The oxygen ions freed assist in accelerating the dissociation of the silica.

This molten salt employed as the intermediate reaction-promoting liquid, should have certain characteristics as follows: (a) It should be stable at the reaction temperature involved, that is to say, it should have little or no volatility at this temperature. (b) It should not react chemically with the vitrifiable mixture or, if so reactive, the reaction produced should take part into the formation of the glass itself. Of course, since molten salts are not usually entirely insoluble in the glass produced, it should also be possible to eliminate any entrained intermediate material by a relatively simple and inexpensive procedure.

Certain mineral salts such as those of the halogens, the alkali sulfates, or mixtures of the two, serve adequately as the intermediate molten liquid. We have found that sodium sulfate admirably satisfies the requirements for such an intermediate liquid; and the following description and examples are with particular reference to this material.

Sodium sulfate melts at about 884° C. but has only a small vapor tension at temperatures up to 1300 to 1400° C., which are well above the usual temperature range of formation of glass. Moreover its density in the liquid or molten phase is less than that of the nascent molten glass, so that it floats thereon. This fact greatly facilitates the carrying out of our novel process.

Furthermore, sodium carbonate which constitutes the principal source of $Na_2O$ in the manufacture of glass, is miscible in all proportions in the molten sodium sulfate. The mixture of these two materials is effective to completely wet the particles of silica and other materials which are essentially insoluble in the molten sodium sulfate.

The mutual solubility of the silica-soda-lime glasses and sodium sulfate, is very small when the silica content exceeds 50%. Since this percentage is exceeded by most of the industrial glasses manufactured, the major portion of the sulfate separates out from the molten glass and only a small quantity thereof is entrained.

It is remarkable that despite the presence of a large excess of sodium ions in the intermediate reaction, the composition of the glass produced does not have an amount of sodium over and above that desired or required in the final product. This results from the fact that during the course of the reaction the extant electrically neutral condition causes the sulfate ions to remain associated each with two sodium ions, so that only the excess sodium ions in the sodium sulfate bath are able to enter into the composition of the nascent glass.

Since the sodium sulfate reacts very little wtih silica below 1400° C., it is a stable intermediate liquid. Therefore, losses thereof due to the small quantities entrained in the glass, and through decomposition and evaporation are a minimum.

We have found that when a mixture of glass-making materials is deposited onto the bath of molten sodium sulfate, for example, at about 1200° C., the mixture of, for example, sand, sodium carbonate, limestone, dolomite, feldspar, etc., effects an immediate and violent reaction, accompanied by the evolution of large amounts of gas because of the rapid decomposition of the carbonates. The reaction is also violent if the materials which are to form the glass, are introduced separately into or onto the bath of molten sulfate. The mass is thus energetically mixed wtihout the need for mechanical stirring or agitation.

Whatever the procedure, the vitrifiable materials disappear rapidly into the mass of molten sulfate and, obviously, their temperature rises rapidly to form nascent glass which settles or decants to the bottom of the furnace. The molten glass contains practically no gas because all of the gas generated in the course of the reaction readily escapes through the molten sulfate, due to its lower viscosity.

The molten glass is thus easily separated from the mass of molten sulfate floating thereon, by decantation and drawing off. Its temperature is then raised to the order of 1350° C. to 1550° C., that is, to a degree above that extant in the reaction with the sulfate. This elevation in temperature is for the purpose of effecting complete vitrification, to melt any remaining particles of the glass-making mixture, to eliminate any remaining $Na_2SO_4$, and to homogenize the glass.

A very great advantage of the invention is that the nascent glass is formed at a much more rapid rate than in a conventional or prior art procedure. This is due to the fact that each particle of glass-making material or mix is immediately enrobed in or surrounded by the molten sulfate so that its temperature rises rapidly to the necessary reaction value. Further, the refining and homogenization of the materials is equally accelerated over prior art procedures. In this way, any given rate of production may be effected in a furnace which is of greatly reduced size over one required to produce at an equal rate but in accordance with prior art procedures. Or, conversely, a greatly increased rate of production is made possible by our invention, over a furnace of equivalent size, constructed and operated in accordance with prior art procedures.

Stated in another way, the output of prior art furnaces is restricted by the limited heat output due to heat losses otherwise suffered through radiation and convection when temperatures in the area above the molten mix are elevated above a certain limiting maximum. The increase in output which may be effected by the present invention not only enables reduction of the surface areas of the furnace for any given production rate, but also provides a substantial reduction in refractory materials required. Because of the lower heat losses there is also a material saving in fuel for the same rate of production.

It is possible, in addition, to carry out the initial phase of the formation of nascent glass, by means of molten sodium sulfate, at a temperature which is lower than previously known procedures, thus prolonging the useful life of the furnace, in particular the refractory materials of which it is constructed. In this regard it has been ascertained that refractories of alumina or nearly pure zirconia operate in an especially satisfactory way in the presence of molten sodium sulfate at temperatures of from 1200° to 1500° C.

The elaboration, refining and homogenization in a process according to the present invention may be described in three phases which are more clearly characterized and distinct than in conventional or prior art procedures. These are as follows.

(1) The initial phase may be considered as the quick period of reaction which begins when the glass-forming materials, in particular the silica, and sodium carbonate, come into contact with the bath of molten sodium sulfate and in which the sodium carbonate or soda dissolves. This first period is characterized by an abundant formation of foam due especially to the release of $CO_2$ from the carbonates. If the addition of materials is interrupted the violent reaction and release of gases ceases rapidly and the surface of the molten sulfate becomes tranquil. The duration $T_1$ which is of the order of minutes only, for this turbulent reaction may be considered as the time necessary for the transformation of the glass-making composition. That is, it may be considered as the time during which the heterogeneous mixtures is transformed to a much more homogenous mass consisting essentially of a calcic-soda-silicate sufficiently enriched with silica to pass the threshold of immiscibility with the $Na_2SO_4$, as determined by the equilibrium curve and as a result, to separate out from the mass entrained within the bath of molten sodium sulfate. The composition of this mass which settles out is not yet the same as the final composition of the glass finally obtained, and is nascent glass. It is, nevertheless denser than the molten sulfate and hence sinks toward the bottom of the reaction chamber and possibly entrains some of the glass-making ingredients which have not had time to react with the sulfate. The portion of the materials which has not reacted is composed principally of silica in the form of quartz and/or cristobalite, the latter being in preponderant quantity when the descent of the calcic-soda-silicate through the layer of sodium sulfate is sufficinetly slow. This is because time is afforded for the transformation of some of the quartz into cristobalite. This allotropic transformation is, moreover, promoted by the ionic nature of the bath as well as by the high temperature extant.

(2) The time of descent of the calcic-soda-silicate through the molten sodium sulfate and into the nascent glass below, is relatively slow. In order to give a general idea of the time of descent it may be stated that the time in minutes is about ⅔ of the thickness of the layer of molten sodium sulfate, expressed in centimeters. Thus if the thickness of the layer of $Na_2SO_4$ is, for example, of the order of 60 cm., the time $T_2$ during which the calcic-soda-silicate remains in contact with the sodium sulfate during its descent therethrough, will be of the order of 40 minutes. The time $T_2$ is long in comparison to $T_1$, that is, in comparison to the time of introduction of the glass-making materials into the molten sulfate and the separation of the immiscible calcic-soda-silicate from the sulfate. The time $T_1$ requires only a few minutes. In the course of the second phase just described, and which may last several tens of minutes, the calcic-soda-silicate during its descent, gradually alters its character in the direction of the final glass product, as digestion of the ingredients which have not reacted with the entrained silicate, approaches completion. This mass of calcic-soda-silicate finally collects at the botton of the reaction chamber.

(3) At this time the third phase of the process commences. The duration $T_3$ of this phase may be regulated at will by the geometrical form and dimensions of the furnace. During this third phase homogenization of the glass is completed and perfected. Also during this phase such sodium sulfate as has been entrained in the molten nascent glass, is effectively eliminated either by heat alone and/or by reduction.

The total duration of the process is $T_1+T_2+T_3$. As has been explained, time $T_1$ is of the order of a few minutes only, while $T_2$ may require several tens of minutes. Thus the total time for any given quantity or mass of glass to be manufactured is dependent mainly upon $T_3$. In practice it has been found that the total time $T=T_1+T_2+T_3$, is advantageously from 1 to 2 hours. The length of time T will depend to a certain extent upon the local temperatures at the different points or localities of the path of the material through the furnace. For any pre-selected weight of glass to be produced per unit of time and an experimentally determined time for T, the dimensions of the different parts of the furnace may be established or determined.

The foregoing discussion of time phases is merely to give a general idea of the time lapse between the introduction or deposit of any particular mass or batch of glass-making materials onto the molten sulfate, and the withdrawal of completed glass containing the same mass or batch. Thus the description of times is not to be considered as a limitation of the invention; nor is it to be deemed as descriptive of a discontinuous or batch procedure. The process is, in fact, uniform and continuous.

It is apparent that the total time duration of our novel process of glass production is much shorter than conventional or prior art procedures, so that for any given rate of production the furnace required may be correspondingly greatly reduced in size. Conversely, size for size, a furnace constructed for carrying out out inventive process is capable of producing glass at a rate much greater than a conventional furnace of equivalent or comparable physical size.

From the foregoing it is seen that the production of glass in accordance with this invention, comprises separation and decantation in the vitreous phase by means of a mass of molten sodium sulfate or like material. The carrying out of this step is effected essentially in a first compartment of Florentine-vase shape or contour, and in which the two first phases as explained in the preceding paragraphs, are effected during periods $T_1$ and $T_2$. The nascent glass which precipitates or decants to the bottom of this compartment during time $T_1+T_2$, passes continuously to a second compartment wherein the homogenization of the glass takes place during the aforesaid time $T_3$.

The initial reaction during time $T_1$ is violent and clogging because of the great amount of foam which the reaction produces. For this reason, in order to augment the yield of glass per unit of time or, what is the same thing, the quantity of glass-making materials deposited onto the molten sulfate, it is desirable to increase to the extent possible, the exposed area or surface of the molten sulfate. On the other hand, it is necessary, if the second and third stages of production are to be of satisfactorily short duration, that the volume of the compartment to which the nascent molten glass passes, be sufficiently small so that it may be properly homogenized and liberated from any entrained sulfate. Further, it is clear that the vitreous mass collected at the bottom of the reaction chamber or compartment, beneath the layer of molten salt, will be nearer to the exit from the compartment, that is, will have a shorter distance to travel to the second compartment, the greater the thickness of this floating layer of molten salt. Thus the form and dimensions of the apparatus will be determined in accordance with considerations of practicability, as just described.

Among the chief objects of the invention are to provide:

(1) A process and appartus by which glass is produced in a much shorter time than in prior art procedures and devices;

(2) A process which enables great reduction in size of the apparatus for the production of glass at any given rate;

(3) A process which effects material savings over prior art procedures, in cost of furnace and heat consumed per unit mass of glass completed;

(4) A process which enables the carrying out of initial steps of vitrification at a lower temperature than in prior art procedures and which thus effectively conserves the furnace and prolongs its life;

(5) An apparatus for carrying the process into effect, which conserves heat to the maximum extent and provides a minimum flow path between compartments;

(6) An apparatus which is admirably suited to serve one of a plurality of glass forming production lines;

(7) A process and apparatus which are effectively and efficiently capable of producting glass at a cost per unit mass of completed glass, less than prior art procedures and apparatus;

(8) A process and apparatus wherein the glass is produced in a series of stages and in different compartments each of which is maintained at an optimum temperature for the stage effected therein.

Other objects and advantages of the invention will become clear to those skilled in the art, after a study of the following detailed description, in connection with the accompanying drawings showing several non-limiting examples of apparatus for carrying the novel process into commercial production.

Figure 1:
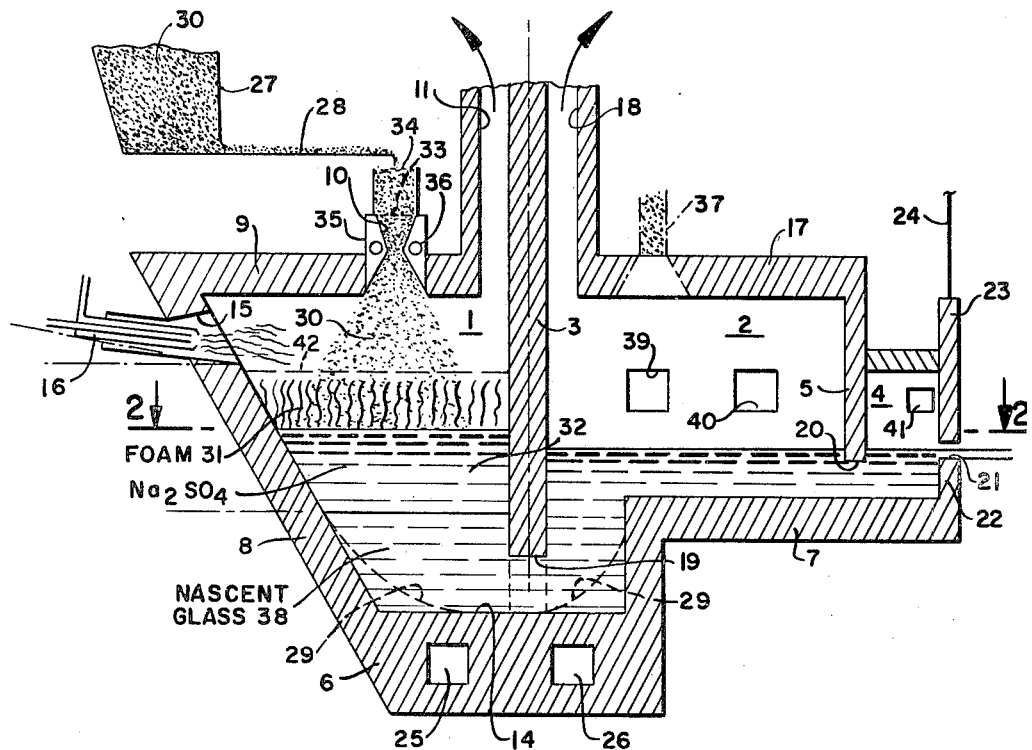
FIGURE 1 shows in vertical section a first embodiment of reactor and which may be considered as comprising a funnel-shaped reaction compartment, because of the inclination of one of its walls.

Referring in detail to FIGURE 1, the apparatus comprises walls which define first and second chambers or compartments 1 and 2, separated by a partition wall 3. A third compartment 4 is located at the outlet from compartment 2 and receives the completed molten glass therefrom. As shown, wall 3 separates compartments 1 and 2, and terminates above the level of floor surface 14 to form a passageway 19 through which nascent glass passes from compartment 1 into compartment 2. Likewise a wall 5 depends from roof 17 and terminates above the level of floor surface 7, to provide a passageway 20 through which molten glass passes from compartment 2 into compartment 4. Compartment 1 is completed by an inclined outer wall 8, a roof 9 having openings 10 for the ingress of batch glass-making materials, and 11 for the egress of gases formed during the reaction. As shown upon FIGURE 2, side walls 12 and 13 are also convergent downwardly and inwardly to form floor surface 14 of reduced area so that molten nascent glass descending in compartment 1 is directed into compartment 2 along and adjacent floor 6. An opening or openings 15 in the upper portion of wall 8, accommodate one or more fuel burners 16.

Compartment 2 includes a roof 17 provided with a passageway 18 for the egress of gases. The passageway beneath partition 3 is identified at 19, and that beneath partition 5, at 20. The exit for molten glass from compartment 4, is shown at 21 and is formed by a wall 22 upstanding from floor 7 and a door which is vertically and slidably mounted so that, by means not shown, it may be vertically adjusted to correspondingly alter the effective size of the egress or exit opening 21. As shown, the wall 22 and door 23 may be vertically coplanar. In order to provide for proper temperature throughout the apparatus, burners in addition to 16 may be provided in floor 6, in openings or passageways indicated at 25 and 26. Glass making batch materials may be supplied to opening 10 from a hopper 27, by conveyor means schematically indicated at 28. Material 30 may be screened at 33 before being passed to reaction chamber 1. The screen is preferably of the shaker, oscillating or non-clogging type. In order to prevent escape of gas from compartment 1, through feed opening 10, a level of materials 30 is maintained above that of the opening, as indicated at 34. Thus such gas can escape only through opening or stack 11. Means not shown provide for a steady flow of materials 30 onto the molten sulfate 32. In order to prevent clogging of feed passage or opening 10, due to the heat emanating from the furnace, a cooling chamber 35 is supplied with coolant by piping 36 connected with a source not shown.

As batch materials are released by conveyor 28 and screened, they fall directly onto the mass of molten sulfate 32 floating in chamber 1 atop the underlying mass of molten calcic-soda-silicate 38.

Floor surface 14 may be convex upwardly as indicated in dotted lines 29. This results in a decrease in the mass of vitrous calcic-soda-silicate collected in chamber 1 at any time, and the volume of nascent glass in chamber 2. A second feed orifice or opening may be provided in roof 17, as indicated in dotted lines 37. This opening may be used as desired, to deposit supplemental glass making materials into chamber 2 and/or to supply materials such as carbon to reduce and eliminate the small amount of sulfate entrained in the glass in this chamber.

Supply of materials to compartment 1 with materials 30, may be continuous or intermittent. In the first case the rate of feed is so regulated that the layer of foam 31 above molten sulfate 32, does not exceed a certain thickness. In the second case, each batch or portion is added after the immediately preceding batch has ceased foaming; and, of course, the average rate of addition of materials 30 is equated to the output of glass.

Heating of the materials in the apparatus is effected, as previously described, by burners such as 16, assisted by other burners located in openings or passageways 25 26 in the floor of the furnace, in the side walls of compartment 2, as indicated for example at 39, 40, and in the side walls of compartment 4, as indicated by way of example, at 41. In the case of burner or burners 16 it should be noted that opening 15 through which each burner passes or in which it is located, has an inwardly and downwardly sloping bottom surface, so that any molten salt which finds its way into this opening, drains back into the compartment. Also to be noted is the fact that the burner or burners 16 are inclined inwardly and downwardly so that flame therefrom is correspondingly directed toward the surface of the molten sulfate and heat is thus utilized to maximum advantage. The feed of materials 30 is regulated so that the layer of foam over the molten sulfate does not rise above a level indicated by line 42, FIGURE 1, which it will be noted is at the level of the lower surface of opening 15. Burners located at 25, 26, FIGURE 1, act to maintain the temperature of the floor of the furnace at the desired value in order that the nascent glass may pass readily through passageway 19 into compartment 2.

Burners 39, 40 act to elevate and maintain the temperature in compartment 2 at such a temperature as will digest the final traces of silica in the glass and eliminate any of the sulfate which may have been entrained in the nascent glass and carried thereby into compartment 2 in an excessive amount. Gas emitted from the glass in compartment 2, such as may be caused by vaporization and elimination of entrained sulfate, is withdrawn through stack or exhaust passageway 18. These stacks or exhaust passageways communicate with means which recover the vaporized sulfate.

Figure 2:
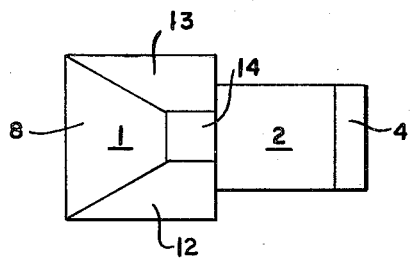
FIGURE 2 is a schematic plan view to a reduced scale, of the apparatus of FIGURE 1.

Compartment 1 is advantageously shaped with sloping walls 8, 12 and 13, as previously described, so that it has the form of an inverted truncated pyramid. This shape results in a reduced area of the interface between the molten sulfate 32 and the nascent glass 38, while affording an adequate surface area for the sulfate. FIGURE 2 shows schematically and in plan, the general arrangement and relations of the several compartments 1, 2 and 4.

Figure 3:
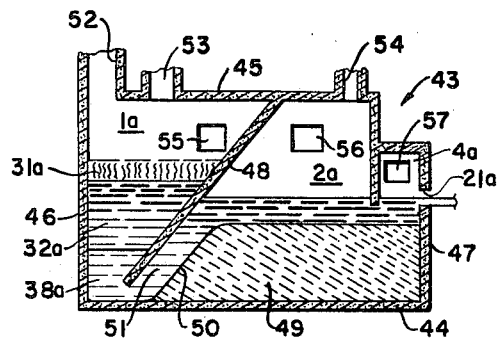
FIGURE 3 is an axial vertical section to a scale reduced from FIGURE 1, of a second embodiment also having a funnel-shaped reaction compartment by reason of a sloping partition between the two compartments.

A compact form of furnace with funnel-shaped reaction chamber is identified generally at 43, FIGURE 3. This apparatus may be generally rectangular in plan, with base or floor 44, roof 45, and walls such as 46, 47. The compartments 1a and 2a are separated by a partition 48 which is inclined downwardly and rearwardly as clearly shown upon the figure, so that the horizontal cross sectional areas of chamber 1a decrease downwardly. Refractory material 49 built up from floor 44 in compartment 2a, has an inner sloping end 50 generally parallel with and spaced from partition 48 to form a passageway 51 in and along which nascent glass rises in its travel from compartment 1a into 2a. This material 49 also acts to decrease the depth of molten glass in compartment 2a. In view of the previous description of FIGURES 1 and 2, it is deemed sufficient to point out finishing compartment 4a, discharge opening 21a leading therefrom, exhaust gas stack 52, materials feed opening 53, supplemental opening 54 communicating with compartment 2a, and burner opening locations 55, 56, 57 in compartments 1a, 2a and 4a, respectively. Additional burner openings not shown may be provided in floor 44 and in material 49, if desired or required for adequate and proper temperature control. The layers of foam, molten sodium sulfate and nascent glass are identified at 31a, 32a and 38a, respectively.

The advantages of the apparatus of FIGURE 3 reside, inter alia, in a better and more efficient utilization of heat and a more satisfactory flow of nascent glass. The external or exposed area of the furnace is, for a rectangular construction, reduced to a minimum, with correspondingly minimized loss of heat by convection and radiation.

Figure 4:
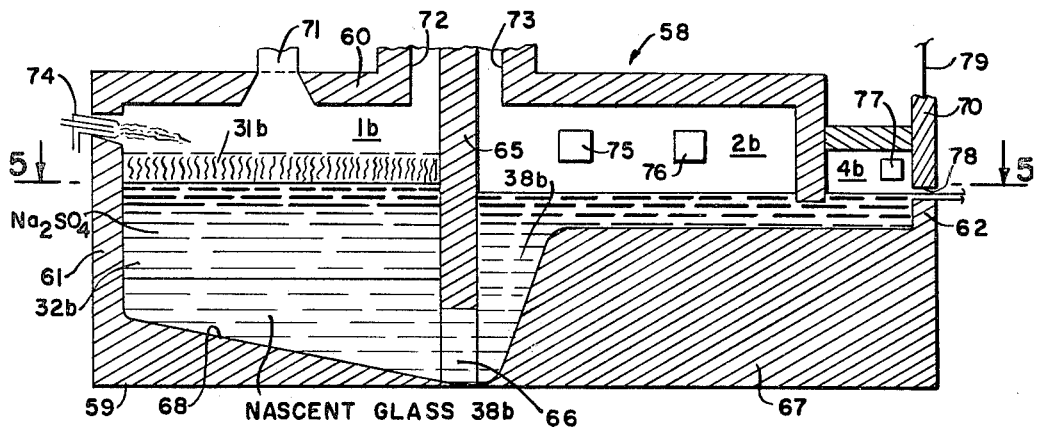
FIGURE 4 is a central vertical section of another embodiment having a funel-shaped reaction chamber.
Figure 5:
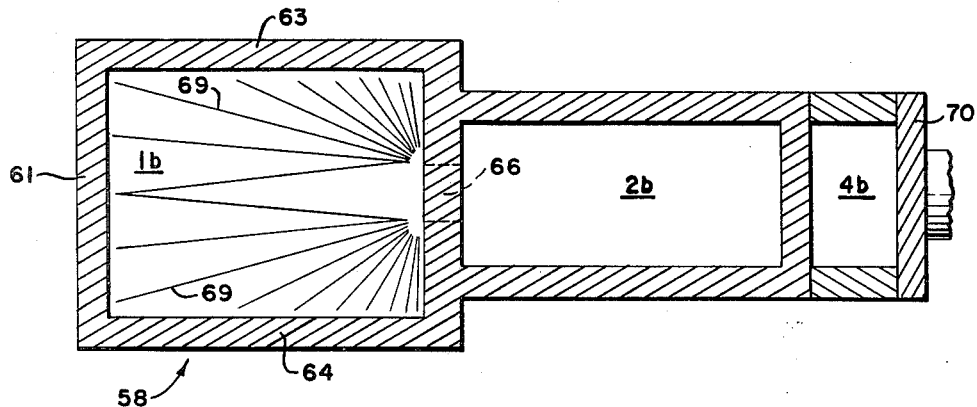
FIGURE 5 is a horizontal section in a plane identified by line 5—5, FIGURE 4.

FIGURES 4 and 5 show another embodiment in vertical longitudinal section and horizontal section, respectively. The furnace, generally identified at 58, includes flood 59, roof 60, end and side walls 61, 62, 63, 64, etc., and partition wall 65 separating compartments 1b and 2b, and stopping short of floor 59 to form a submerged passageway 66 through which nascent glass flows from compartment 1b to 2b. Floor 59 in compartment 2b is thickened as indicated at 67, to thereby decrease the depth of glass in this compartment. It is noted that while walls 61, 62, 63, etc., are vertical, floor 59 has a surface which slopes downwardly and forwardly in all vertical planes through a point in passageway 66, so that flow of glass is directed to this passageway from all increments of area of the surface. Since the remaining features are similar to those described in connection with FIGURES 1 and 2, it is sufficient to identify exit or third compartment 4*b*, vertically sliding outlet door 70, materials feed opening 71, exhaust stacks 72 and 73 from compartments 1*b* and 2*b*, respectively, burners 74, 75, 76, 77 in the several compartments, exit opening 78, layer of foam 31*b*, molten sulfate 32*b*, and nascent glass 38*b*. As in the apparatus of FIGURE 1, door 70 is vertically slidable and adjustable in position by means generally identified at 19. Additional burners not shown may be provided in openings in floor 59 and thickened portion 67, in correspondence with those shown at 25 and 26, FIGURE 1, in order to assure proper fluidity of the glass, and correct temperature control at the various locations throughout the furnace.

Figure 6:
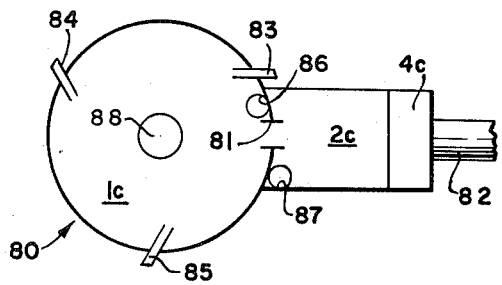
FIGURE 6 is a plan view to a reduced scale, of a furnace constructed in accordance with the invention, and having a circular reaction chamber.

FIGURE 6 shows generally at 80, in plan, the form of an apparatus for carrying the novel process into practice, wherein compartment 1*c* is circular in horizontal section and has vertical side walls. This compartment opens through a submerged passageway 81 into compartment 2*c* formed by walls extending generally radially of compartment 1*c*. These walls also form the glass collecting and fining compartment 4*c* from which completed glass is withdrawn from the furnace, as indicated at 82.

The floor of compartment 1*c* is funnel-shaped so that all lines intersected by vertical planes through a point in passageway 81, slope downwardly toward this point and thus direct the nascent glass uniformly to and through the passageway, into compartment 2*c*.

Burners 83, 84, 85 extend tangentially through the circular wall of compartment 1*c* and create a swirl of hot gases which effectively hold the materials within this compartment at the desired temperature. Evolved gases are extracted from compartment 1*c* through stack 86, and from compartment 2*c*, through stack 87. Glass making materials are fed through opening 88 into compartment 1*c*. Thus, in the species being described, compartment 1*c* is circular, while compartments 2*c* and 4*c* are rectangular in horizontal section. While eminently practicable, there are certain advantages, in a generally circular form of apparatus, in making the second compartment annular and in surrounding coaxial relation with the first compartment.

Figure 7:
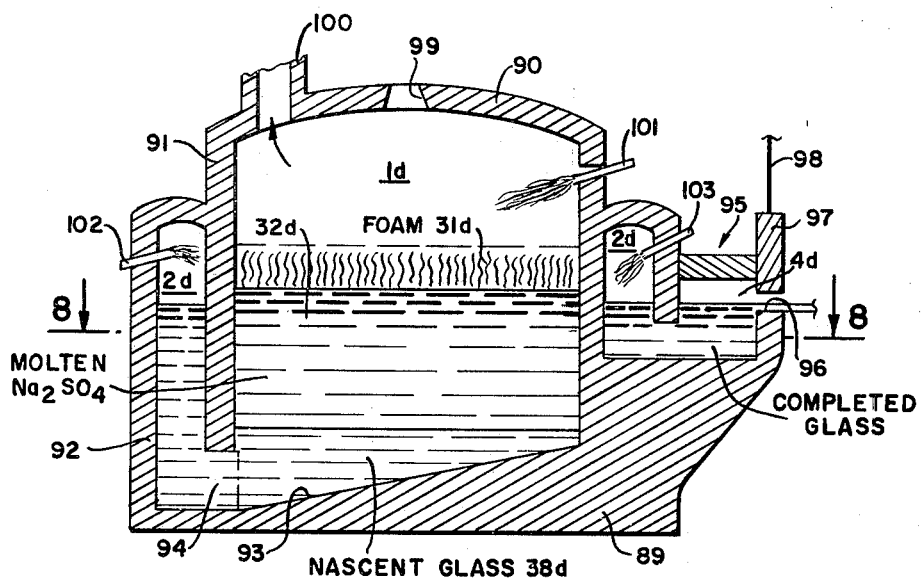
FIGURE 7 is a central vertical section through a further embodiment having a circular reaction chamber and an annular fining chamber coaxially surrounding the reaction chamber.
Figure 8:
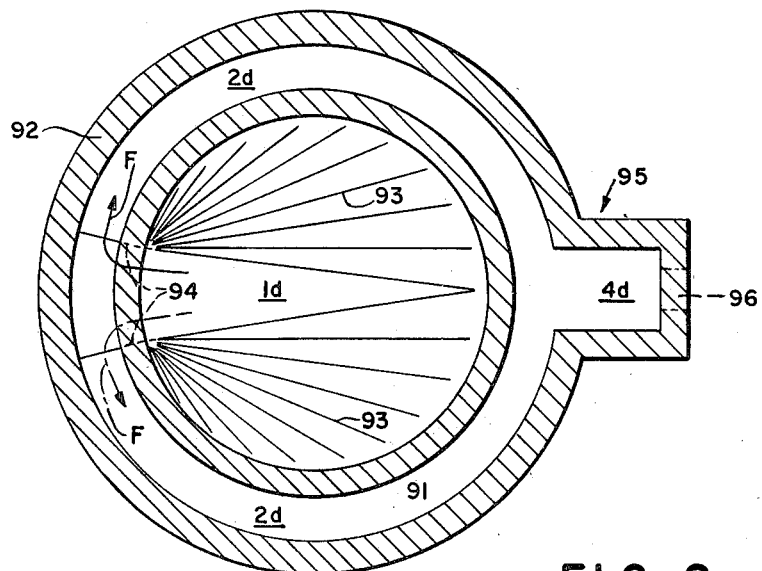
FIGURE 8 is a section taken in a plane identified by line 8—8, FIGURE 7.

Such a construction is shown upon FIGURES 7 and 8 wherein the apparatus comprises a floor 89, a roof 90, and cylindrical wall 91, conjointly defining reaction chamber 1*d*. An annular wall 92 surrounds wall 91 in generally coaxial and radially-spaced relation therewith, to form with wall 91 a second or annular compartment 2*d*. As indicated at 93, FIGURES 7 and 8, the surface of floor 89 is funnel-shaped so as to slope downwardly to the left, in all vertical planes through a point generally in a submerged opening 94 in wall 91. Thereby molten nascent glass is directed in a smooth and uniform flow from compartment 1*d* to 2*d*, through opening 94.

Walls generally identified at 95 extend radially to the right as viewed upon FIGURES 7 and 8, to form a collection compartment 4*d*, from which completed glass is withdrawn through opening 96, including door 97 which, as previously mentioned, is vertically slidable by means identified at 98. Referring to FIGURE 7, glass making materials are introduced through feed opening 99, centrally dipsosed in roof 90. Gases evolved in the reaction in compartment 1*d* are exhausted therefrom through stack opening 100. Burners, only one of which is shown at 101 are disposed about and through openings in wall 91 and, as shown, are inclined downwardly and inwardly to direct their flame toward the molten materials in the compartment. Other burners such as 102, 103, extend through openings in wall 92 above the level of the glass in compartment 2*d* and act to regulate or to elevate the temperature therein. Other burners like 25, 26, FIGURE 1, may be provided in floor 89. Although it is preferred that compartment 2*d* be annular so that nascent glass flows in both directions from opening 94 as indicated by arrows F, FIGURE 8, it is contemplated that compartment 2*d* may be semi-annular and extend in only one direction from this opening.

While the figures under description show but one collecting and completion compartment 4*d*, it is contemplated that two or more such compartments may be angularly disposed and related about, and leading from compartment 2*d*. Each such compartment will be constructed and equipped as shown at FIGURE 7, and each will supply a glass rolling or other glass processing apparatus, not shown. As previously, the layer of foam is shown at 31*d*, the molten sulfate at 32*d* and the nascent glass passing to chamber 2*d*, at 38*d*.

The circular form of apparatus, particularly as shown upon FIGURES 7 and 8, is desirable because of its conservation of heat, it being noted in this regard that compartments 1*d* and 2*d* have at least a part of circular wall 91 in common so that there is a minimum of heat loss therefrom to ambient air.

Figure 9:
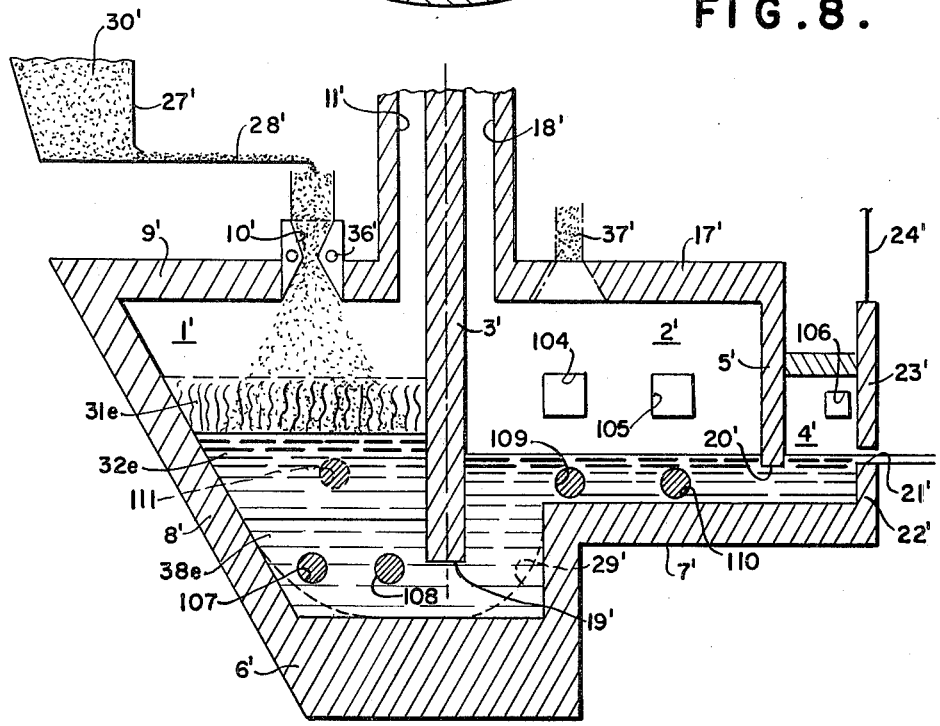
FIGURE 9 is a vertical axial section through an apparatus similar to that of FIGURE 1, but equipped with electric heating means in place of fuel burners.

In the forms of the invention previously described, heating of the furnace and materials therein is effected by fuel burners. The apparatus of FIGURE 9 shows the use of electric heaters. Since the apparatus depicted is generally like that of FIGURE 1, as previously described, the same reference characters, primed, are used to denote most of the parts. It is therefore deemed sufficient to identify compartments 1′, 2′ and 4′, wall 5′ separating chambers 2′ and 4′, floor portions 6′, 7′, inclined outer wall 8′, roof 9′ having feed opening 10′, opening or stack 11′ for exhaust gases evolved in compartment 1′, roof 17′ over compartment 2′, exhaust stack 18′ leading from compartment 2′, submerged passageway 19′ beneath partition 3′ and interconnecting compartments 1′, 2′, end wall 22′ of third or fining chamber 4′, vertically slidable door 23′ of the outlet opening for glass from compartment 4′ and supported by rod or cable means 24′. Also noted are hopper 27′ for glass-making materials 30′, feed conveyor 28′, cooling means 36′ and the alternative curved form of surface for floor 6′ indicated at 29′, foam layer 31*e*, molten sulfide 32*e*, and nascent glass 38*e*.

The space above the molten glass in compartment 2′ is heated by burners 104, 105. A third burner 106 is located in the space above the glass in compartment 4′. Heating electrodes 107, 108 are positioned in compartment 1′ so as to be immersed in the body of molten glass therein. Likewise electrodes 109, 110 are located in chamber 2′ to be immersed in the molten glass therein. These electrodes are particularly useful when the glass in compartment 2′ is to be heated to a temperature higher than that of the materials in compartment 1′.

Although electrodes 107, 108, etc., are shown as immersed in the molten glass, other locations for electrodes are contemplated, such as, for example, electrode 111 immersed in the molten sulfate 32*e*. Current then passes between this electrode 111 and electrodes 107 and 108.

Where the temperature in compartment 2′, for example, is higher than that in compartment 1′, let us say 1500° C., it is necessary to compensate for the loss of sodium sulfate due to the fact that a certain small amount thereof is entrained in the glass and carried therewith into compartment 2′. Another small amount is lost through volatization. In order to limit these losses of sulfate or other salts, it is desirable to maintain the temperature in compartment 1′ at not more than 1400° C. The loss of sulfate may be made up by like material added to those 30′ in hopper 27′. The statements of this paragraph are, of course, equally applicable to the apparatuses shown in FIGURES 1 through 8.

Some advantages of the sodium sulfate used as a constituent of the molten salt bath have been shown in the foregoing.

However, as mentioned hereabove, alkaline-metal halogenides can also be used, and particularly the sodium chloride.

In comparison to the sodium sulfate the sodium chloride offers certain advantages:

The density of molten sodium chloride being about 1.4 against about 1.8 for the sodium sulfate, a much easier sodocalcic-silicate glass decantation is offered.

The sodium chloride being more volatile than the sulfate, the molten chloride bath is preferably heated at a temperature not exceeding about 1000 to 1100° C. The molten chloride sodium bath can be heated by the Joule effect, by means of conventional electrodes, made of graphite or molybdenum for example, while the molten sodium sulfate attacks such electrodes and compels to have recourse to materials such as stannic oxide or metals such as those of the platinum ore.

On the FIG. 9 is shown a device for heating the molten salt bath by current passage, between an electrode 111 situated in the said bath and two electrodes 107 and 108 respectively situated in the molten glass.

However in order to obtain an electric heating separated for the layer 32e of molten salt and the layer 38e of molten glass, the electric heating of the layer 32e may also be effectuated by means of two or several electrodes mounted in an electric circuit separated from that of the electrodes 107 and 108.

The walls of the furnace being in contact with the molten salt layer are advantageously constituted by a refractory material made of practically pure alumina (98–99%), while the rest of the furnace can be made of refractory materials more usual in the glass furnaces.

Having fully disclosed the invention, what we claim and desire to secure by Letters Patent is:

1. The method of producing molten glass, comprising, floating in direct contact with the surface of a bath of nascent molten soda-lime glass, a supernatant layer consisting essentially of molten alkali metal sulfate essentially insoluble in said molten nascent glass, continuously adding to the surface of said molten sulfate, at a controlled rate, raw batch ingredients comprising a mixture of sand, sodium carbonate and calcium carbonate, and withdrawing newly formed molten glass at an equivalent controlled rate from the bath of nascent molten glass below the level of the layer of said molten sulfate.

2. The process of producing molten soda-lime glass, comprising, forming molten nascent glass in a heated furnace, floating in direct contact with the surface of said molten glass a supernatant layer consisting essentially of molten sodium sulfate essentially insoluble in said molten nascent glass maintained at a temperature of at least 1200° C., depositing on the surface of said layer a pulverulent mixture of raw batch materials comprising sand, sodium carbonate and calcium carbonate, and withdrawing newly formed molten glass, formed by the reaction of the mixture of the batch materials, from the bottom of the furnace, from beneath the layer of molten sodium sulfate.

3. The process of claim 2 wherein said raw batch materials are continuously added to the supernatant layer, and wherein said newly formed molten glass is continuously withdrawn at a rate coordinated with the rate of addition of said raw batch materials to maintain substantially constant the level of said supernatant layer.

4. Apparatus for the production of glass from batch materials, comprising, a floor, a roof, and side walls interconnecting said floor and roof to form a furnace, a partition in said furnace separating the interior thereof into first and second discrete compartments communicating only through a horizontal passageway beneath said partition adjacent said floor, said partition being inclined with respect to the floor of said first compartment and parallelly spaced with respect to the floor of said second compartment, means for feeding raw batch materials to said first compartment through an opening in said roof centrally of said first compartment, and individually controllable heating means carried by the side walls of said compartments, to heat glass-making materials therein.

5. Apparatus according to claim 4 in which the horizontal cross section of said first compartment decreases downwardly toward said horizontal passageway.

References Cited

UNITED STATES PATENTS

| | | | |
|---|---|---|---|
| 1,822,705 | 9/1931 | Mambourg | 65—335 |
| 1,905,534 | 4/1933 | Wadman | 65—347 |
| 2,773,111 | 12/1956 | Arbeit et al. | 65—136 |
| 2,975,555 | 3/1961 | Zellers et al. | 65—134 |
| 3,294,505 | 12/1966 | Garrison | 65—134 |
| 3,325,268 | 6/1967 | Penberthy | 65—135 |
| 3,238,030 | 3/1966 | O'Connell | 65—32 |
| 3,240,581 | 3/1966 | O'Connell | 65—32 |
| 3,288,451 | 11/1966 | Worner | 65—347 |
| 3,397,972 | 8/1968 | Brichard | 65—27 |

S. LEON BASHORE, Primary Examiner

E. R. FREEDMAN, Assistant Examiner

U.S. Cl. X.R.

65—32, 99, 133, 135, 335, 346, 347